UNITED STATES PATENT OFFICE.

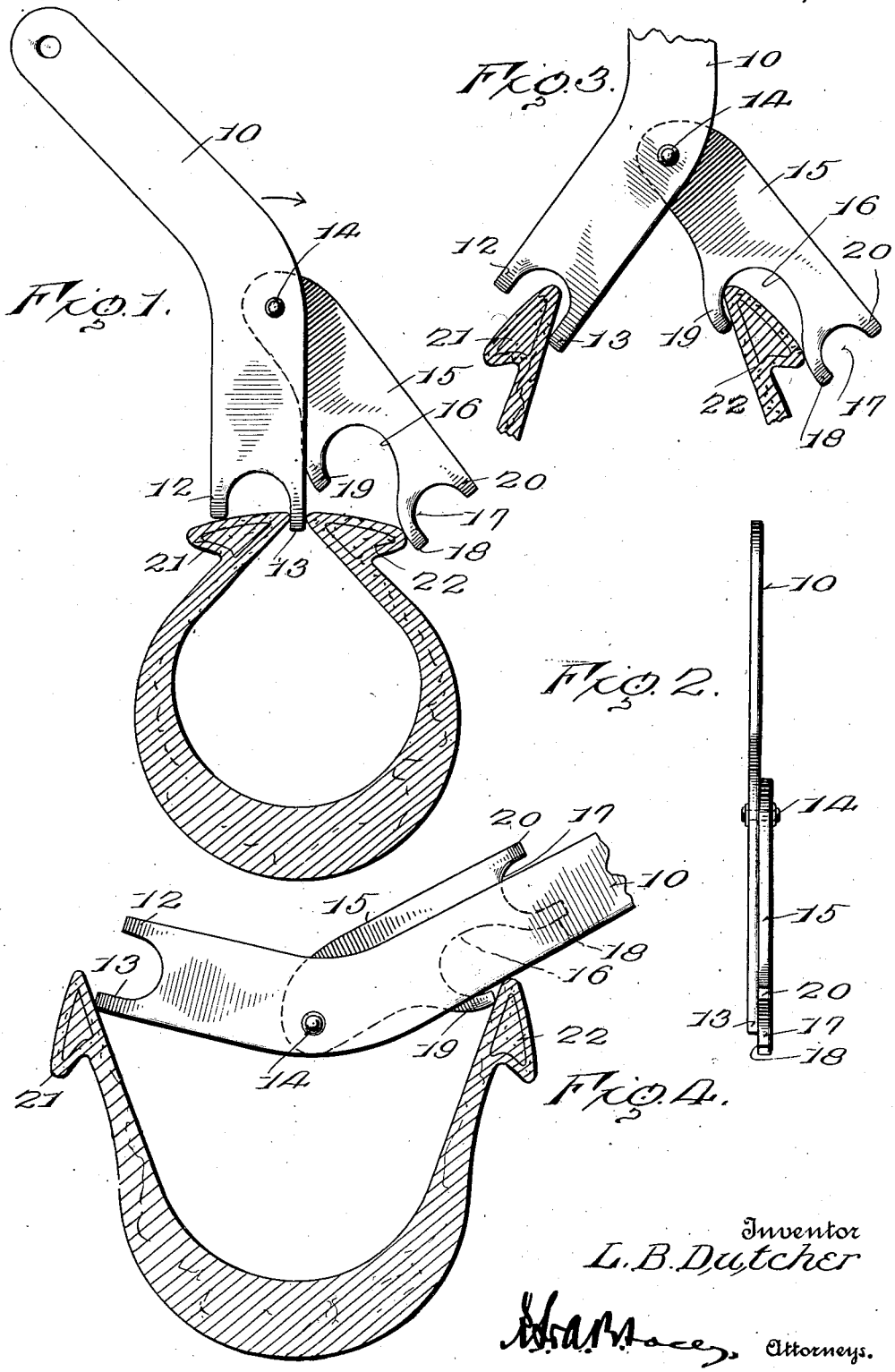

LEWIS BELDEN DUTCHER, OF OSWEGO, NEW YORK.

AUTOMOBILE-TIRE IMPLEMENT.

1,269,585.　　　　Specification of Letters Patent.　　Patented June 18, 1918.

Application filed June 30, 1917. Serial No. 177,972.

*To all whom it may concern:*

Be it known that I, LEWIS BELDEN DUTCHER, a citizen of the United States, residing at Oswego, in the county of Oswego and State of New York, have invented certain new and useful Improvements in Automobile-Tire Implements, of which the following is a specification.

This invention relates to improvements in implements for separating the beaded edges of pneumatic tire casings, and holding them distended to enable the interior of the casing to be cleansed preparatory to repairing and applying the cement to the interior previous to vulcanizing, and likewise to facilitate the application of the inner side "blowout" patches.

With these and other objects in view, the invention consists in certain novel features of construction, as hereinafter shown and described and then specifically pointed out in the claims; and in the drawings illustrative of the preferred embodiment of the invention—

Figure 1 is a transverse section of a conventional pneumatic tire casing with the clencher edges or beads in closed position with the implement applied and ready to be actuated;

Fig. 2 is an edge view of the improved implement;

Fig. 3 is a view representing the operation of the implement;

Fig. 4 is a view similar to Fig. 1 with the implement fully distended and holding the sides of the casing in separated position.

In repairing pneumatic tire casings it is necessary to distend the sides to enable the interior to be reached with suitable cleansing and repairing implements, and the implement which is the subject matter of the present application is designed to readily and quickly accomplish this result and hold the sides of the casing in distended position as shown in Fig. 4, thus leaving both hands of the operator free for working and without danger of injury to the fingers or wrists of the operator by the relatively sharp inner edges of the "beads" of the casing.

The improved implement comprises a stock represented as a whole at 10 and with an outwardly opening recess in one end, the side portions 12—13 of the recess being of unequal lengths, and one portion of the bar directed obliquely to its longitudinal axis as shown. Pivoted at 14 to the bar 10, preferably at its bend, is a lever device 15 having outwardly opening recesses 16—17 near its free end. The recesses are separated by an outwardly directed portion 18, while the opposite wall 19 of the recess 16 projects laterally of one side edge of the member 15, the opposite side portion 20 of the recess 17 extending substantially in parallel relation to the longitudinal axis of the lever member as shown. The members 10—15 are in flat form and operate side by side, as shown in Fig. 2.

By providing the member 15 with two recesses 16—17, the implement is readily adaptable to tire casings of different sizes.

When the implement is to be employed the portion 13 of the member 10 is forced between the "bead" portions 21—22 of the casing 23 and moved in the direction of the arrow in Fig. 1 thus operating as a pry or lever to separate the sides of the casing. The recess 16 or 17 according to the size of the casing, is then engaged with the other "bead" as shown in Fig. 3.

The stock 10 is then moved over until it assumes the position shown in Fig. 4 or until the tire casing is fully distended. When thus arranged, the pivot 14 is disposed below a line drawn through the terminals of the portions 13—19, so that the implement is effectually "locked" in position and will be retained in that position by the resiliency of the material of the casing, while at the same time the implement may be released by an upward pull upon the outer portion of the stock.

The sides of the casing can be separated and maintained in separated position as shown in Fig. 4, leaving the interior of the casing unobstructed for cleansing and applying patches to punctures without interference from the material of the casing or causing annoyance to the operator.

Any required number of the improved implements may be employed and located at any required distances apart.

Having thus described the invention, what is claimed as new is:

1. An implement of the class described comprising a stock having a tire casing bead engaging recess in one end, a lever member pivoted to said bar intermediate the ends thereof and having a plurality of tire casing bead engaging recesses in spaced relation at its free end.

2. An implement of the class described comprising a stock having a bend therein near one end and with an outwardly opening tire bead engaging recess in the shorter end, a lever member pivoted to the stock at its bend and having a plurality of bead engaging recesses in spaced relation at its free end.

In testimony whereof I affix my signature.

LEWIS BELDEN DUTCHER. [L. S.]